(12) United States Patent
Pentelovitch et al.

(10) Patent No.: US 9,301,534 B2
(45) Date of Patent: Apr. 5, 2016

(54) SYSTEM FOR FOOD PRODUCT CASING REMOVAL

(71) Applicants:Noah Z. Pentelovitch, Evanston, IL (US); Henry George Randolph, III, Laramie, WY (US); Sean Michael Wood, Evanston, NM (US); Krystian Zimowski, Albuquerque, NM (US)

(72) Inventors: Noah Z. Pentelovitch, Evanston, IL (US); Henry George Randolph, III, Laramie, WY (US); Sean Michael Wood, Evanston, NM (US); Krystian Zimowski, Albuquerque, NM (US)

(73) Assignee: FORMAX, INC., Mokena, IL (US)

( * ) Notice: Subject to any disclaimer, the term of this patent is extended or adjusted under 35 U.S.C. 154(b) by 0 days.

(21) Appl. No.: 13/917,900

(22) Filed: Jun. 14, 2013

(65) Prior Publication Data

US 2013/0337127 A1    Dec. 19, 2013

Related U.S. Application Data

(60) Provisional application No. 61/659,746, filed on Jun. 14, 2012.

(51) Int. Cl.
| | |
|---|---|
| *A23N 7/00* | (2006.01) |
| *A47J 17/00* | (2006.01) |
| *A22C 17/12* | (2006.01) |
| *A23P 1/10* | (2006.01) |
| *A22C 11/00* | (2006.01) |
| *B26D 3/00* | (2006.01) |
| *B26D 1/04* | (2006.01) |
| *B26D 1/06* | (2006.01) |
| *B26D 7/01* | (2006.01) |

(52) U.S. Cl.
CPC ............... *A22C 17/12* (2013.01); *A22C 11/003* (2013.01); *A23P 1/10* (2013.01); *B26D 3/001* (2013.01); *A47J 17/00* (2013.01); *B26D 1/04* (2013.01); *B26D 1/06* (2013.01); *B26D 7/018* (2013.01); *B26D 2210/02* (2013.01)

(58) Field of Classification Search
CPC .... A22C 11/00; A22C 11/001; A22C 11/003; A47J 17/00; A47J 17/14; A47J 17/16
USPC ........... 99/539, 540, 567, 580, 584, 588, 594, 99/595; 426/105, 389; 452/50, 30, 51
See application file for complete search history.

(56) References Cited

U.S. PATENT DOCUMENTS

| 4,118,828 A | 10/1978 | Melanson |
| 4,123,310 A | 10/1978 | Varon et al. |

(Continued)

OTHER PUBLICATIONS

International Searching Authority, International Search Report and Written Opinion for PCT/US2013/045959, Date of Mailing, Nov. 22, 2013, 11 pgs.

*Primary Examiner* — Dana Ross
*Assistant Examiner* — Brandon Harvey
(74) *Attorney, Agent, or Firm* — Klintworth & Rozenblat IP LLC

(57) ABSTRACT

An automated casing removal system for removing the casing of encased food products supported on a support frame. An inclined surface on the support frame has a staging area onto which encased food product is loaded. The staging area has a cutting member moveable along a portion of the length of the staging area, and a stop mechanism downstream from the cutting member on the inclined surface. The stop mechanism extends within a plane which intersects the inclined surface to prevent the food product from moving down the inclined surface. The staging area has retaining member upstream of the stop mechanism which retains the casing to unravel the casing from the food product as the food product rolls down the inclined surface when the stop mechanism is removed.

13 Claims, 13 Drawing Sheets

(56) References Cited

U.S. PATENT DOCUMENTS

| | | | |
|---|---|---|---|
| 4,414,707 A | 11/1983 | Koken | |
| 5,094,649 A * | 3/1992 | Hall et al. | 452/50 |
| 5,643,071 A | 7/1997 | Williams et al. | |
| 6,080,055 A * | 6/2000 | Leining et al. | 452/50 |
| 2002/0090427 A1 * | 7/2002 | Jordan | 426/144 |
| 2002/0162303 A1 * | 11/2002 | Skrak et al. | 53/492 |
| 2006/0257538 A1 * | 11/2006 | Fryer et al. | 426/332 |

\* cited by examiner

SYSTEM FOR FOOD PRODUCT CASING REMOVAL

RELATED APPLICATIONS

The present application claims the benefit of U.S. Provisional Patent Application No. 61/659,746, filed Jun. 14, 2012, the entire contents of which is incorporated herein by reference.

FIELD OF THE INVENTION

This present disclosure generally relates to food product processing and, more particularly, to the removal of casing from encased food products.

BACKGROUND

In food production systems, there exists a need for removing casing from encased food products such as sausages, cheeses, and the like. Current methods for removing casing from encased food products include manually removing the casing from the products, as well as the use of automated systems for removing the casing from encased food products.

Manual removal of the casing may be inefficient as manual removal may be time consuming and laborious. Manual removal of the casing also presents the potential for injury, and may yield non-uniform results due to variation of a worker's technique. To manually remove a casing, a worker first shears the ends of the encased food product, as well as removing any metal clips on the ends of the encased product, before unwrapping and removing the casing by hand.

Current automated systems for removing casing from food products comprise bulky, complicated components that are lacking in high output efficiency. Such systems may require multiple steps to remove the casing and may be difficult to incorporate into existing production lines.

SUMMARY

A need exists for a system for removing casing from food products which overcome the disadvantages of conventional systems for automated removal of casing.

A need exists for a system for removing casing from food products which is efficient and may be easily incorporated into existing product lines.

A need exists for a casing removal system which allows for easier maintenance and cleaning in accordance with sanitation procedures.

A need exists for a casing removal system which allows for the removal of casing with minimum handling of the encased food product.

In one aspect, an automated casing removal system is provided for removing the casing from encased food products and the system is supported on a support frame. The support frame supports a staging area comprising an inclined surface. The staging area includes a knife blade moveable along a portion of the length of the staging area, and a stop mechanism downstream on the inclined surface from the knife blade. The stop mechanism extends within a plane which intersects the inclined surface. The staging area also includes a gripping region upstream of the stop mechanism. The inclined surface downstream of the staging area includes a discard mechanism for disposal of the removed casing.

In another aspect, the staging area is arranged to receive an axially loaded, encased food product. The staging area includes an inclined surface down from which the food product is prevented from rolling by the stop mechanism. While in the staging position, a knife blade moves along at least a portion of the length of the food product to make a longitudinal cut in the casing. The gripping region may include a vacuum region in contact with the casing in the staging region to exert a negative force on the casing to hold onto the casing. Once a slit is made in the casing and a vacuum force is exerted on the casing, the stop mechanism is moved into its inactivated position to allow the food product to roll down the incline under the force of gravity.

As the food product rolls down the incline, the grasp of the vacuum force on the casing causes the casing to become unraveled. The food product, now with the casing removed, may be transported on to a next support surface for further processing.

To discard the casing, a discard mechanism comprising an opening with a width less than the length of the encased product is positioned downstream of the staging area. The discard mechanism allows the removed casing to fall through the opening under the force of gravity when the vacuum source is turned off. In another example, a vacuum source is positioned beneath the opening to facilitate the passing of the casing through the opening.

In a further aspect, a system for removing a casing from an encased food product is provided. The system includes an inclined surface, a cutting member configured to move relative to the inclined surface and the encased food product to slit a casing of the encased food product, and a retaining member configured to retain the casing of the encased food product subsequent to slitting the casing.

In still another aspect, the system may further include a staging area at least partially defined by the inclined surface and configured to receive the encased food product.

In still a further aspect, the retaining member may be adjacent to and downstream from the cutting member.

In yet another aspect, the cutting member may be a knife blade.

In yet a further aspect, the retaining member may be a vacuum member configured to apply a vacuum force to the casing.

In another aspect, the vacuum member may be at least one suction cup.

In a further aspect, the system may further include a slot defined in the inclined surface, and the cutting member may be positioned in the slot and may be configured to move within and along the slot.

In still another aspect, the system may further include a carriage moveable along at least one guide rod, wherein the cutting member is coupled to and moveable with the carriage.

In still a further aspect, the system may further include a plate extending from the inclined surface.

In yet another aspect, the plate may be pivotable relative to the inclined surface.

In yet a further aspect, the system may further include a stop mechanism downstream of the retaining member along the inclined surface.

In another aspect, the inclined surface may define an opening therein, and the stop mechanism may be moveable between a first position, in which at least a portion of the stop mechanism protrudes through the opening above the inclined surface, and a second position, in which the stop mechanism is positioned below the inclined surface, and, when the stop mechanism is in the first position, the stop mechanism may be configured to inhibit food product from moving down the inclined surface.

In a further aspect, the stop mechanism may be a gate configured to move along a plane that intersects a plane of the inclined surface.

In still another aspect, the inclined surface may define a plurality of openings therein and the stop mechanism may include a plurality of stop members, and each of the plurality of stop members may be configured to move within a respective one of the plurality of openings to inhibit food product from moving down the inclined surface.

In still a further aspect, the system may further include a discard mechanism configured to discard the casing after removal from the encased food product.

In yet another aspect, the discard mechanism may be an opening defined in the inclined surface.

In yet a further aspect, the opening may be downstream of the cutting member and the retaining member along the inclined surface.

In another aspect, a method for removing a casing from an encased food product is provided. The method includes cutting a casing of an encased food product, retaining the casing of the encased food product, and moving the encased food product away from the casing while retaining the casing.

In a further aspect, moving the encased food product may further include moving the encased food product down an inclined surface.

In still another aspect, moving the encased food product may further include rolling the encased food product down the inclined surface.

In still a further aspect, cutting a casing may further include cutting the casing of the encased food product longitudinally along the encased food product.

In yet another aspect, retaining the casing may further include applying a vacuum force to the casing.

In yet a further aspect, applying a vacuum force to the casing may further include applying the vacuum force to the casing with a plurality of suction cups.

In another aspect, retaining the casing may include mechanically gripping the casing of the encased food product.

In a further aspect, the method may further include stopping movement of the encased food product with a stop mechanism prior to cutting the casing of the encased food product.

In still another aspect, the method may further include moving the stop mechanism from a path of the encased food product after cutting the casing to allow the encased food product to move away from the casing.

In still a further aspect, the method may further include releasing the casing after the food product is moved away from the casing.

In yet another aspect, the method may further include moving the casing toward a discard mechanism after releasing the casing.

In yet a further aspect, moving the casing may further include moving the casing down an inclined surface toward the discard mechanism.

In another aspect, the discard mechanism may be an opening in the inclined surface.

Numerous other advantages and features of the present disclosure will be become readily apparent from the following detailed description and the embodiments thereof, from the claims and from the accompanying drawings.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
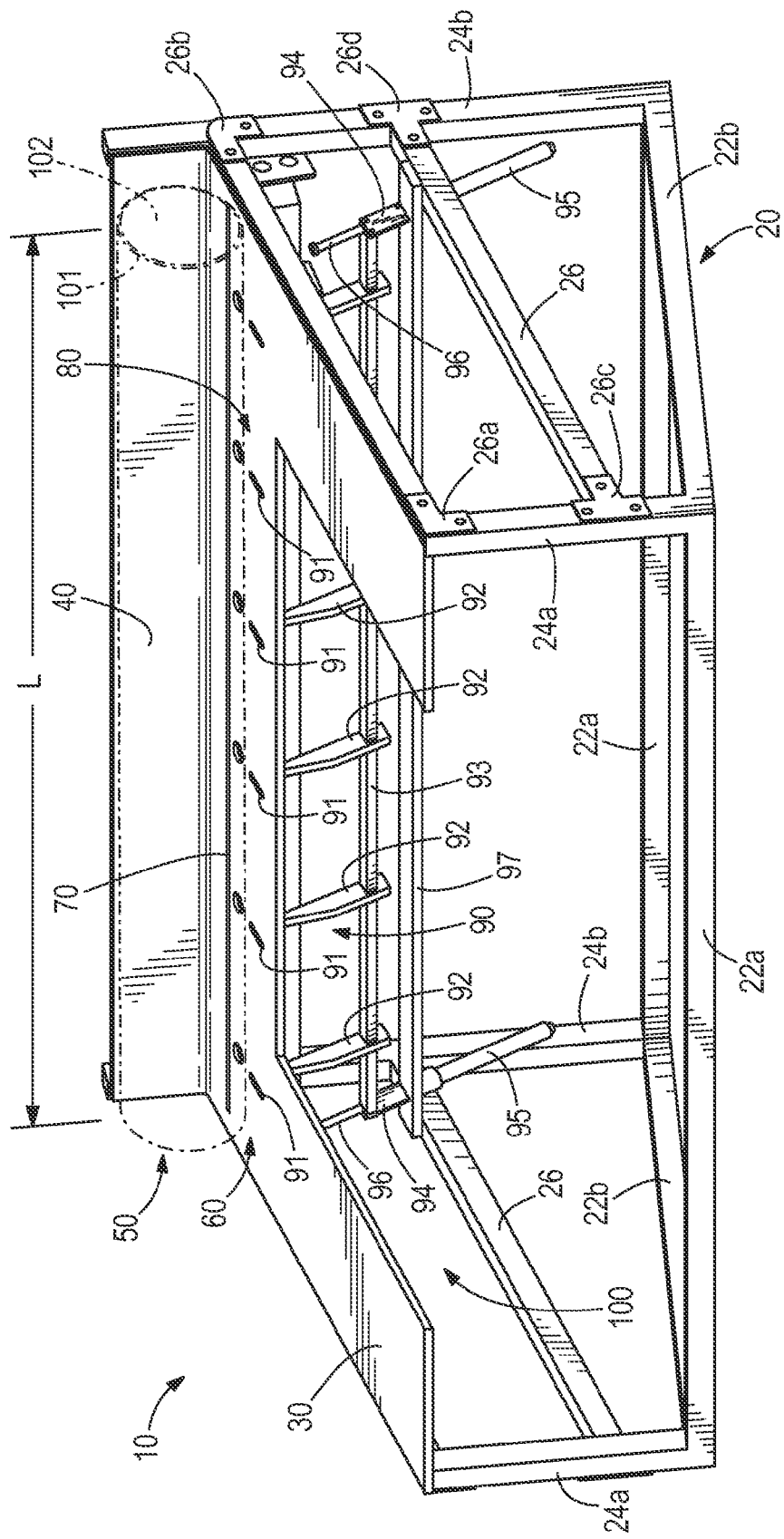
FIG. 1 is a front perspective view of an exemplary casing removal system.
Figure 2:
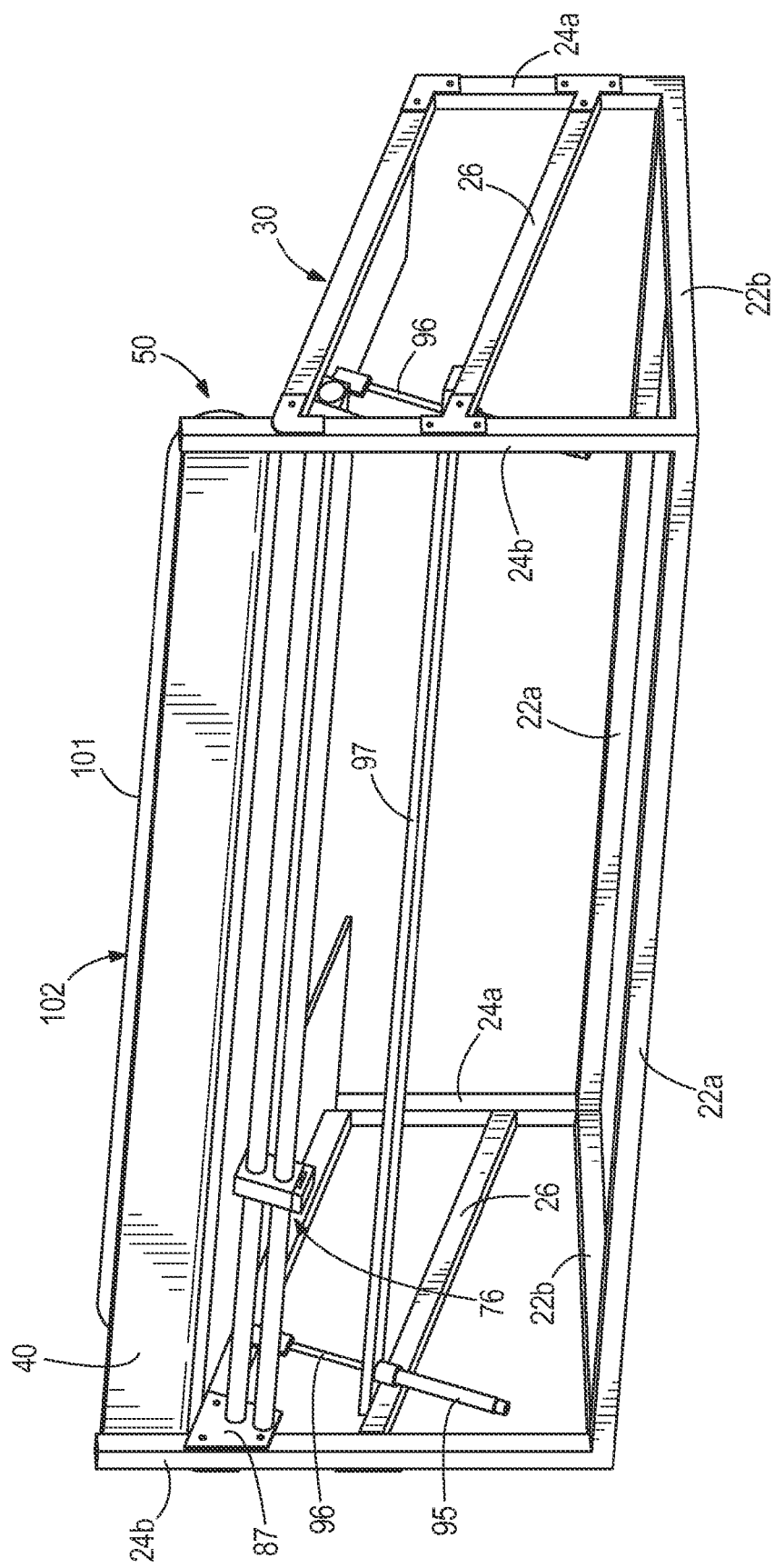
FIG. 2 is a rear perspective view of the casing removal system of FIG. 1.

While the present disclosure is susceptible of being embodied in many different forms, there are shown in the drawings, and will be described herein in detail, examples of embodiments thereof with the understanding that the present disclosure is to be considered an exemplification of the principles of the present disclosure and is not intended to limit the present disclosure to the specific examples of embodiments illustrated and shown.

FIG. 1 illustrates an example of a casing removal system 10. The casing removal system 10 includes a support frame 20 to support an inclined surface 30 and a staging plate 40. The upper portion 60 of the inclined surface 30 and the staging plate 40 form a staging region 50. The staging region 50, illustrated in FIG. 4, also includes the staging plate 40, the upper portion 60 of the inclined surface 30, a knife slot 70 upstream of a retaining region or vacuum region 80, and a stop mechanism 90 downstream of the vacuum region 80. The casing removal system 10 includes a discard mechanism 100 for removal of a casing once the casing is separated from a food product enclosed therein.

The support frame 20, as illustrated in FIG. 1, includes horizontal support bars 22a, 22b arranged in a rectangular base from which vertical support bars 24a, 24b extend. In one example, the support bars 22a, 22b, 24a, 24b are removably connected to each other to allow for ease of assembly or disassembly. Support bars may also be adjustably connected to each other to allow the user to form support frames of various sizes. The relative heights of the vertical support bars 24a, 24b may be adjusted to allow for the degree of incline of the surface 30 to be variable. The cross members 26a, 26b, 26c, 26d may be adjustable to accommodate changes in the height of the vertical support bars 24a, 24b. In another example, the vertical support bars 24*a*, 24*b* may be connected to pneumatic cylinders or other actuating or drive mechanisms which may allow the user to adjust the heights as desired to provide the desired incline angle.

Figure 6:
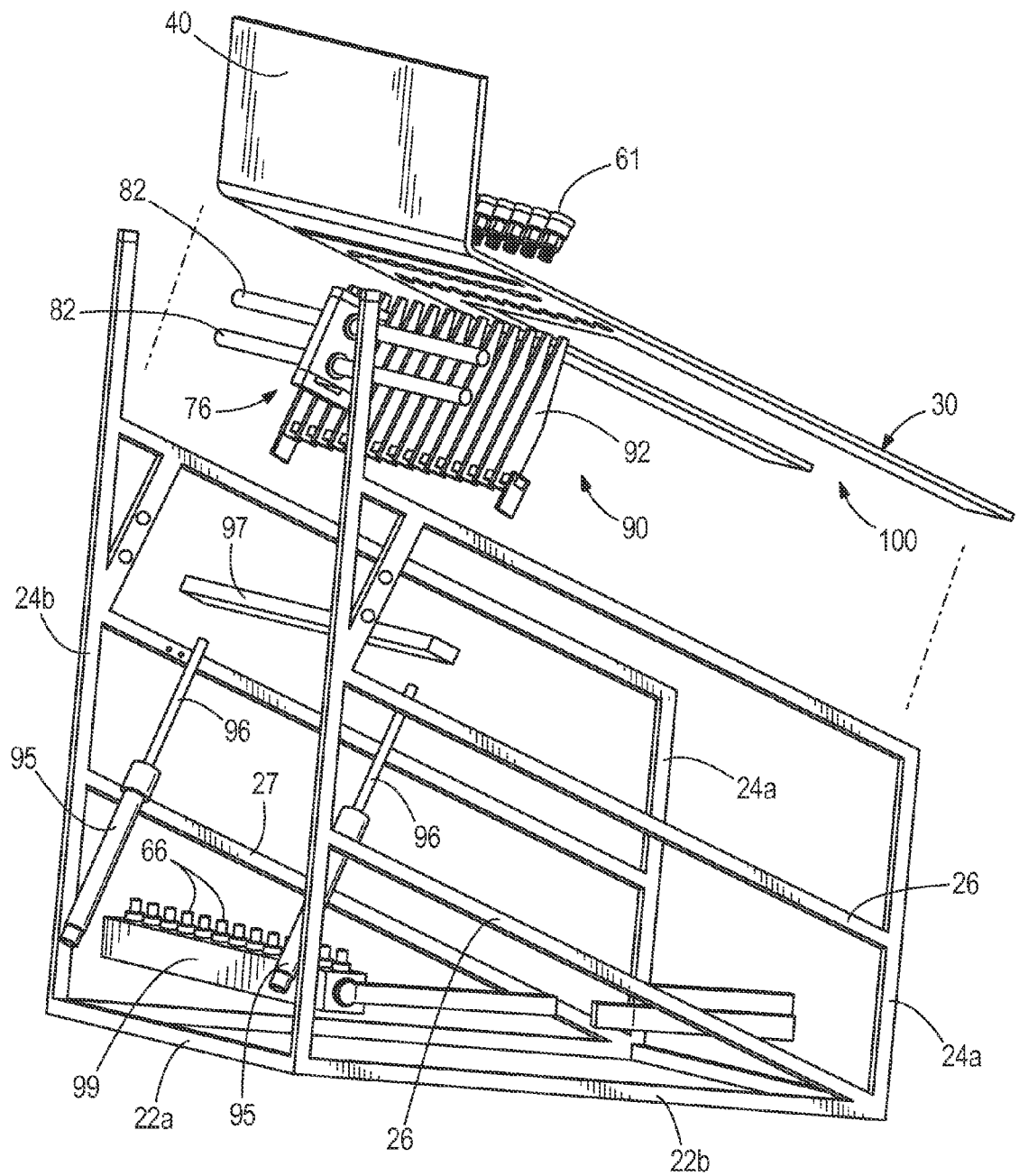
FIG. 6 is a rear exploded view of another exemplary casing removable system.

In other examples, as illustrated in FIG. 6, the support frame may include additional crossbars to accommodate mounting of various components of the casing removal system 10.

In one example, the angle of incline for the inclined surface 30 may be the angle at which the force of friction exerted by the inclined surface 30 on the food product is just overcome by the force of gravity acting upon the food product on the inclined surface 30. In another example, the angle of the inclined surface 30 may be approximately 20 degrees. In further examples, the inclined surface 30 may be a lesser angle or a greater angle to accommodate food products of various size and/or weight. Both the angle of incline and the vacuum force of the vacuum region 80 may be optimized to provide a desired rate of casing removal. A steeper incline will allow the food product to descend the inclined surface 30 at a faster rate. The vacuum force of the vacuum region 80 (i.e., suction cups 61) may be adjusted such that the vacuum force is higher or lower to accommodate a rate of descent of the food product down the inclined surface 30.

The inclined surface 30 may include a low friction material, or a high friction material, selected to provide a desired movement for the particular type of food product processed. Furthermore, the inclined surface 30 may include different regions of frictional force along the downstream path. For example, a high friction material may be positioned at the region just downstream of the staging region to provide a higher friction force, and a lower friction material may be positioned further down the inclined surface 30 to provide a lower frictional force to allow a vacuum force to sufficiently exert a grasp on the casing, and/or to remove an amount of casing such that the remaining casing may be removed easily at higher speeds of descent along the inclined surface 30.

Figure 3:
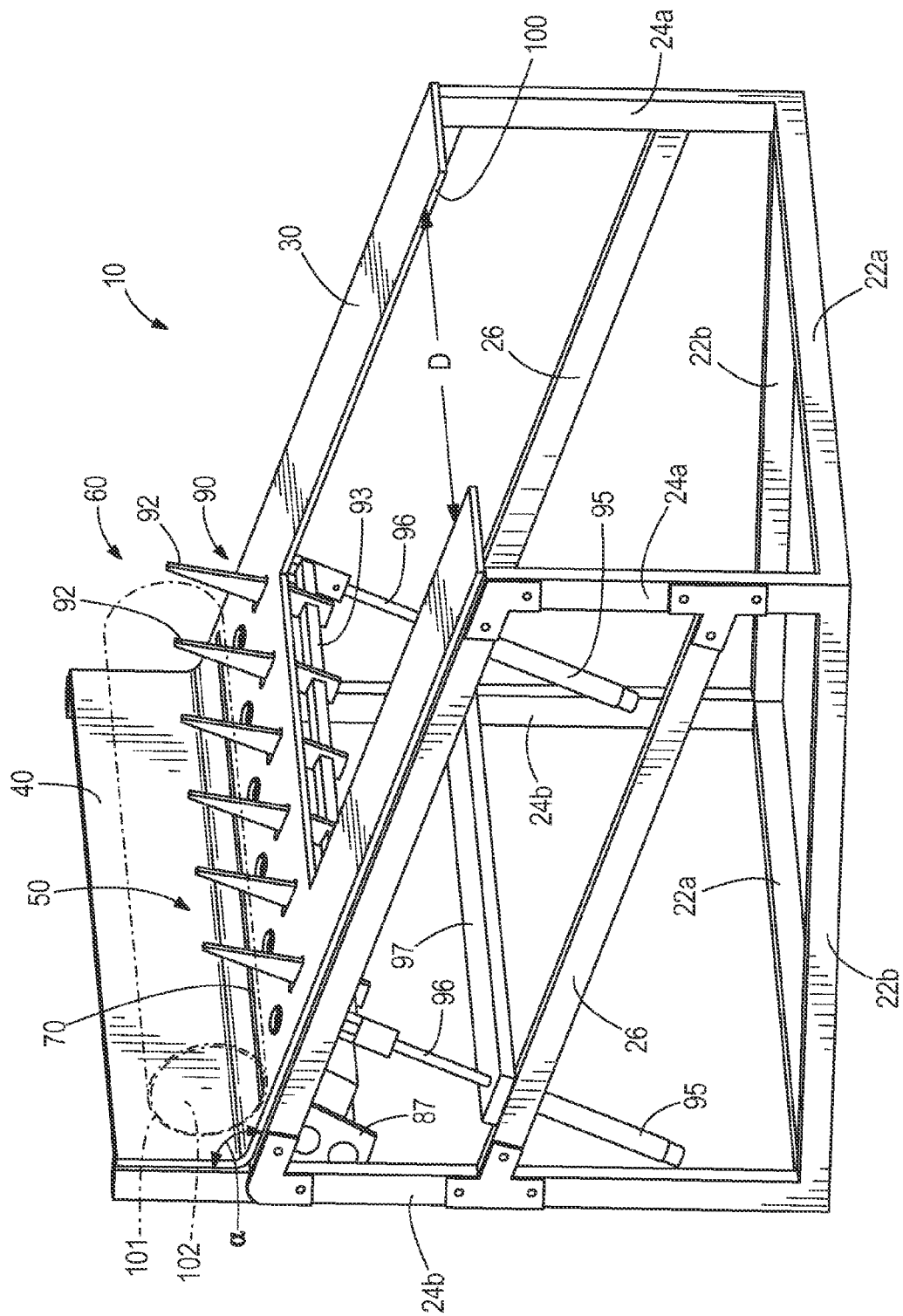
FIG. 3 is a side perspective view of the casing removal system of FIG. 1 illustrating an exemplary stop mechanism in an activated position.
Figure 4:
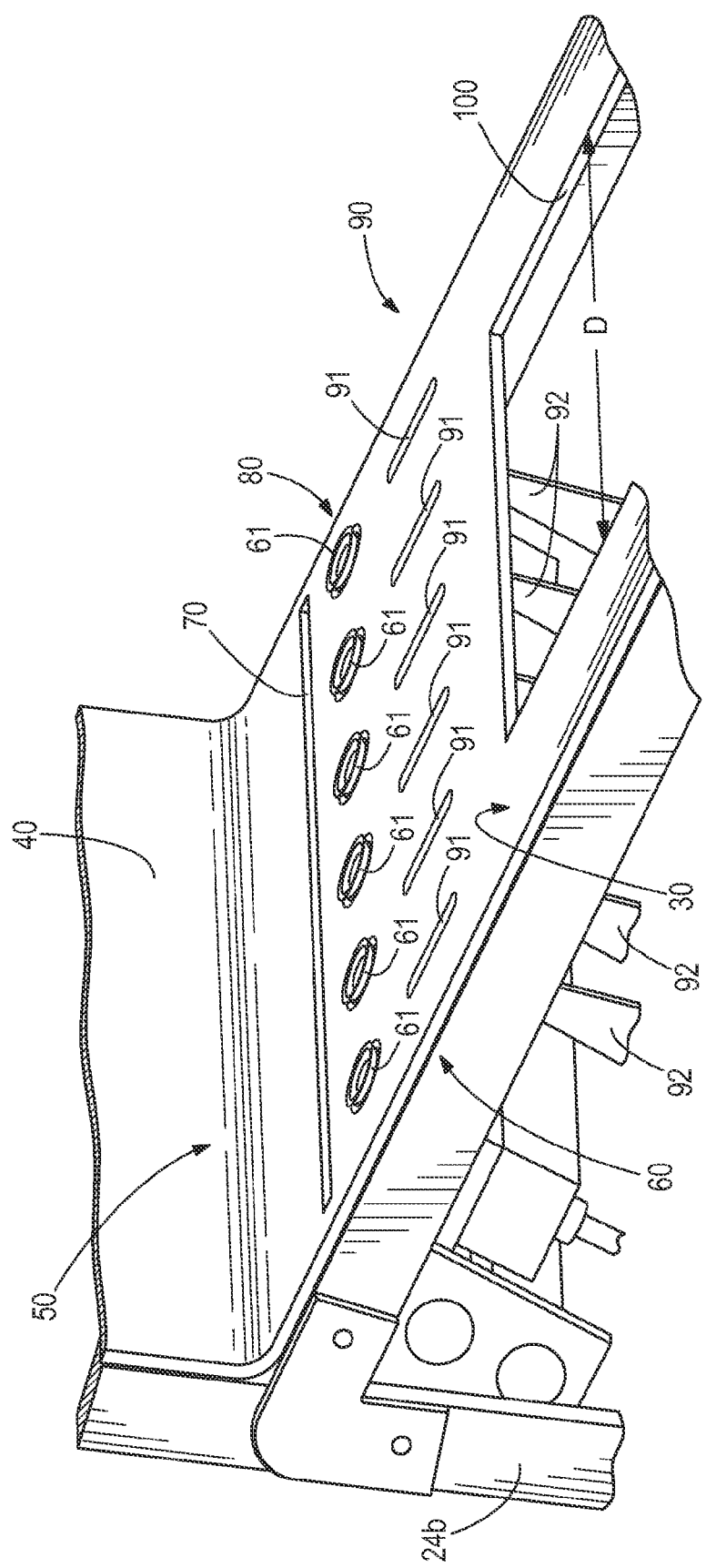
FIG. 4 is an enlarged perspective view of the casing removal system illustrating an exemplary staging area and the stop mechanism in an inactivated position.
Figure 12:
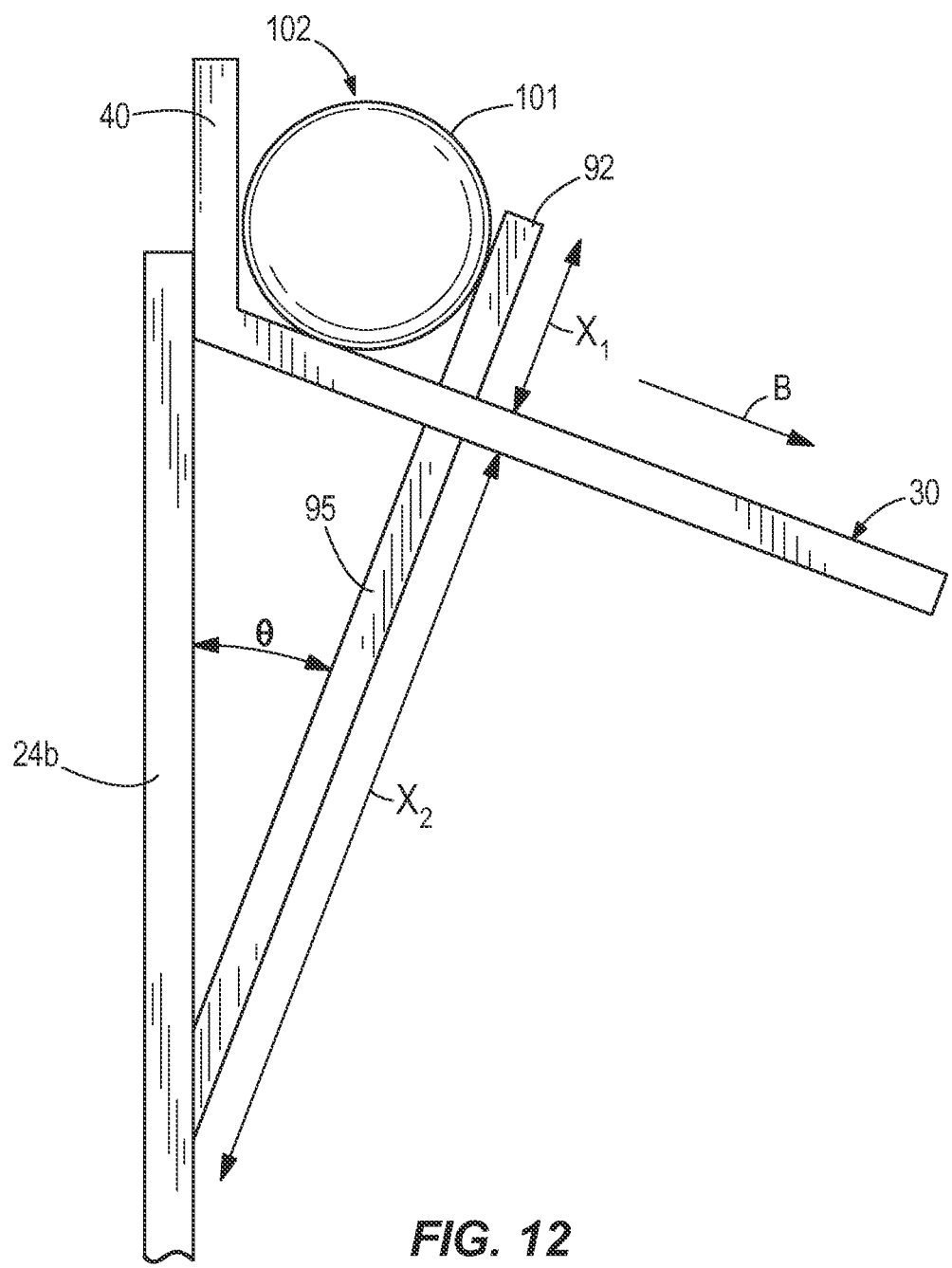
FIG. 12 is a side view of an exemplary food product in an exemplary staging area of the casing removal system.

In one example, the staging plate 40, as illustrated in FIGS. 1, 3, and 4, extends upwards from the inclined surface 30 at an angle α (see FIGS. 3 and 12). Angle α may form an acute, right, or obtuse angle with the inclined surface 30. Angle α may be varied depending on various factors such as the size of the food product or how the food product is loaded. As illustrated in FIG. 1, the length L of the staging plate 40 is the same length as the inclined surface 30, but may be larger or smaller than the length L of the inclined surface 30. The staging plate 40 may also be a discontinuous panel to provide a boundary along the upper side of the inclined surface 30.

Figure 13:
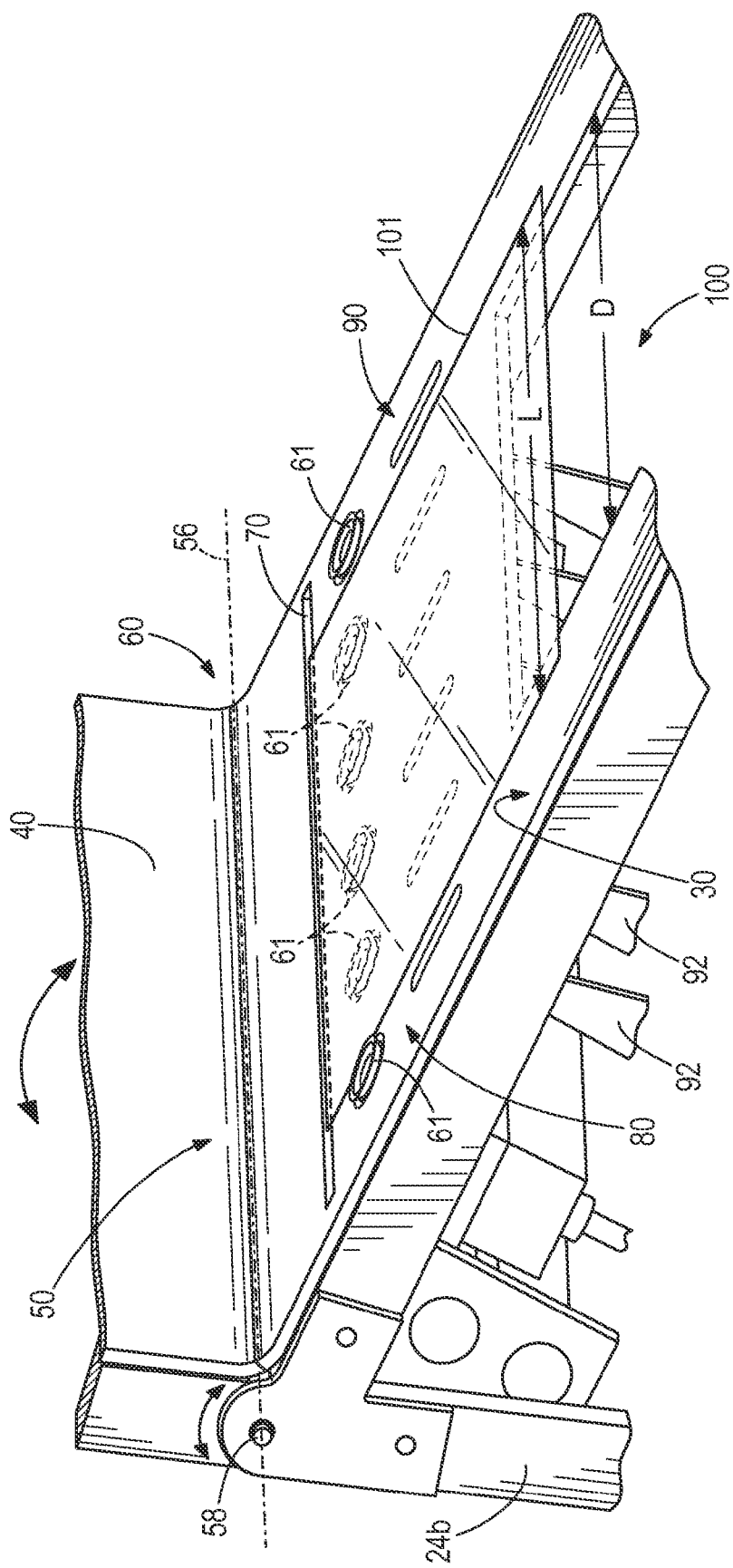
FIG. 13 is a top perspective view of a further exemplary casing removal system.

In one example, the staging plate 40 may be rigidly connected to the inclined surface 30 (see FIGS. 1-4, 6, and 11). In another example, the staging plate 40 may be unitarily formed as one-piece with the inclined surface 30. In a further example, the staging plate 40 may be adjustable such that the staging plate 40 is pivotable about a longitudinal axis 56 parallel to the inclined surface 30 such as, for example, an upper edge of the inclined surface 30 (see FIG. 13). The staging plate 40 may be pivotable to allow for adjustment to accommodate food products of various sizes.

In still another example, the staging plate 40 may be used to transport food product into the staging region 50. Transversely loaded food product may be placed in contact with the staging plate 40 such that the staging plate 40 may rotate about its hinge 58 (see FIG. 13) along the upper edge of the inclined surface 30 so as to tilt or elevate the food product into the desired staging region 50.

With reference to FIGS. 1, 3 and 4, a knife slot 70 is illustrated and defined through the inclined surface 30. A cutting member or knife blade 75 (see FIG. 7) extends through the knife slot 70. The knife blade 75 is connected to a carriage assembly 76 which allows the knife blade 75 to travel along at least a portion of the length of the knife slot 70. The knife slot 70 and the range of motion of the knife blade 75 may be the length of a food product or may be less than the length of the food product.

Figure 7:
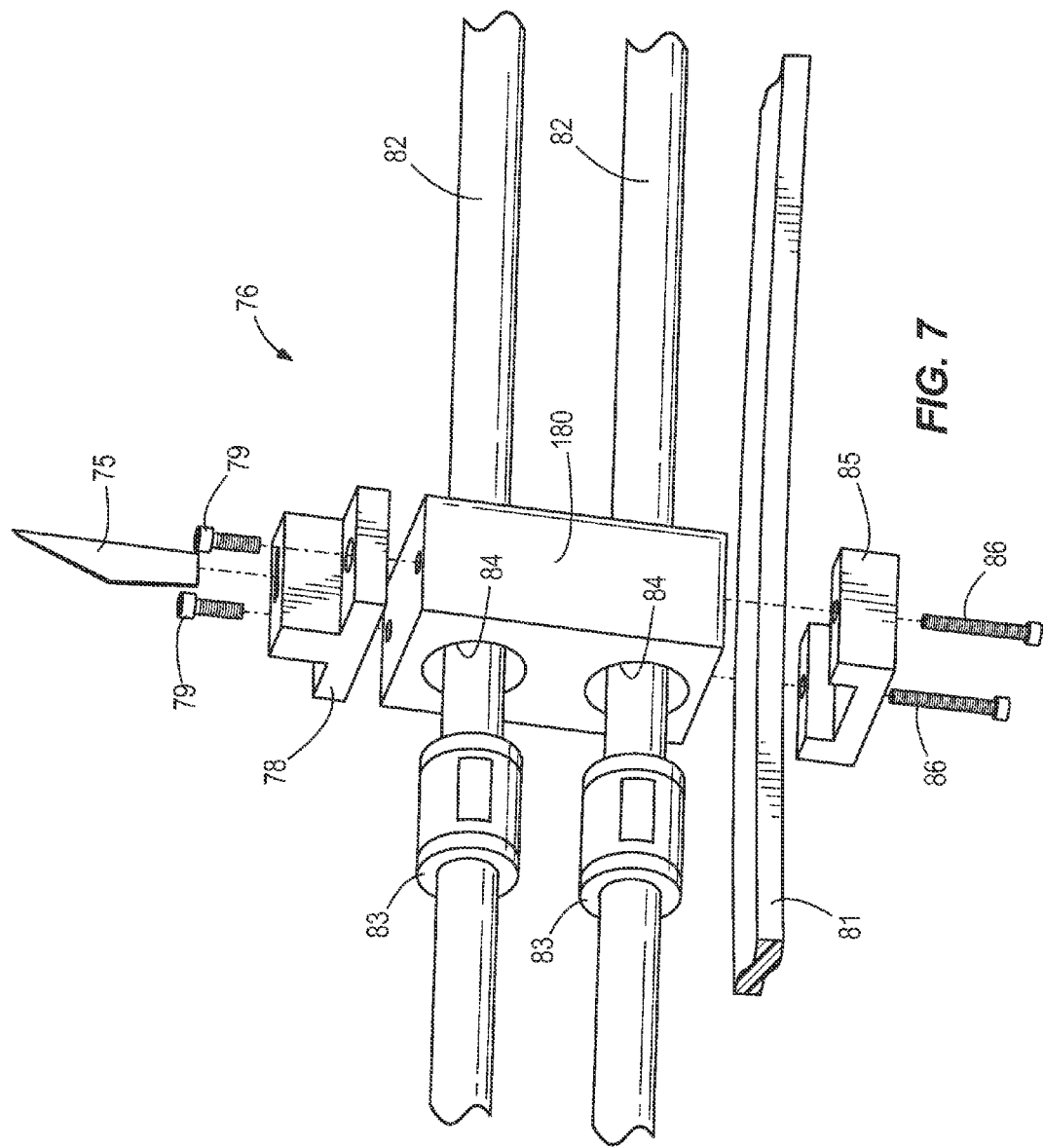
FIG. 7 is an exploded view of an exemplary knife blade assembly of the casing removal system.

FIG. 7 illustrates an exploded view of one example of the carriage assembly 76. In this illustrated exemplary embodiment, the knife blade 75 is inserted into a center of a holder block 78 and secured into position. The knife blade 75 may be secured mechanically via a fastener such as, for example, a screw, or other mechanical engagements.

In one example, the holder block 78 is flanged to allow for a pair of screws 79 to be inserted to connect a base of the holder block 78 to a carriage block 180. Carriage block 180 includes two apertures 84 through which guide rods 82 pass. Bearings 83 are disposed within the apertures 84 (shown in an exploded out position in FIG. 7) to assist with movement of the carriage block 180 along the guide rods 82. Carriage block 180 travels along the guide rods 82 to move back and forth along the guide rods 82. Carriage block 180 is connected to a belt attachment 85 by way of a pair of screws 86. A belt 81 (see FIG. 7) driven by a motor, engages with the belt attachment 85 to drive the carriage block 180. Other methods of moving the carriage block 180 along the guide rods 82, or actuating movement of the knife blade 75 along the knife slot 70 may also be used and are intended to be within the spirit and scope of the present disclosure.

Figure 8:
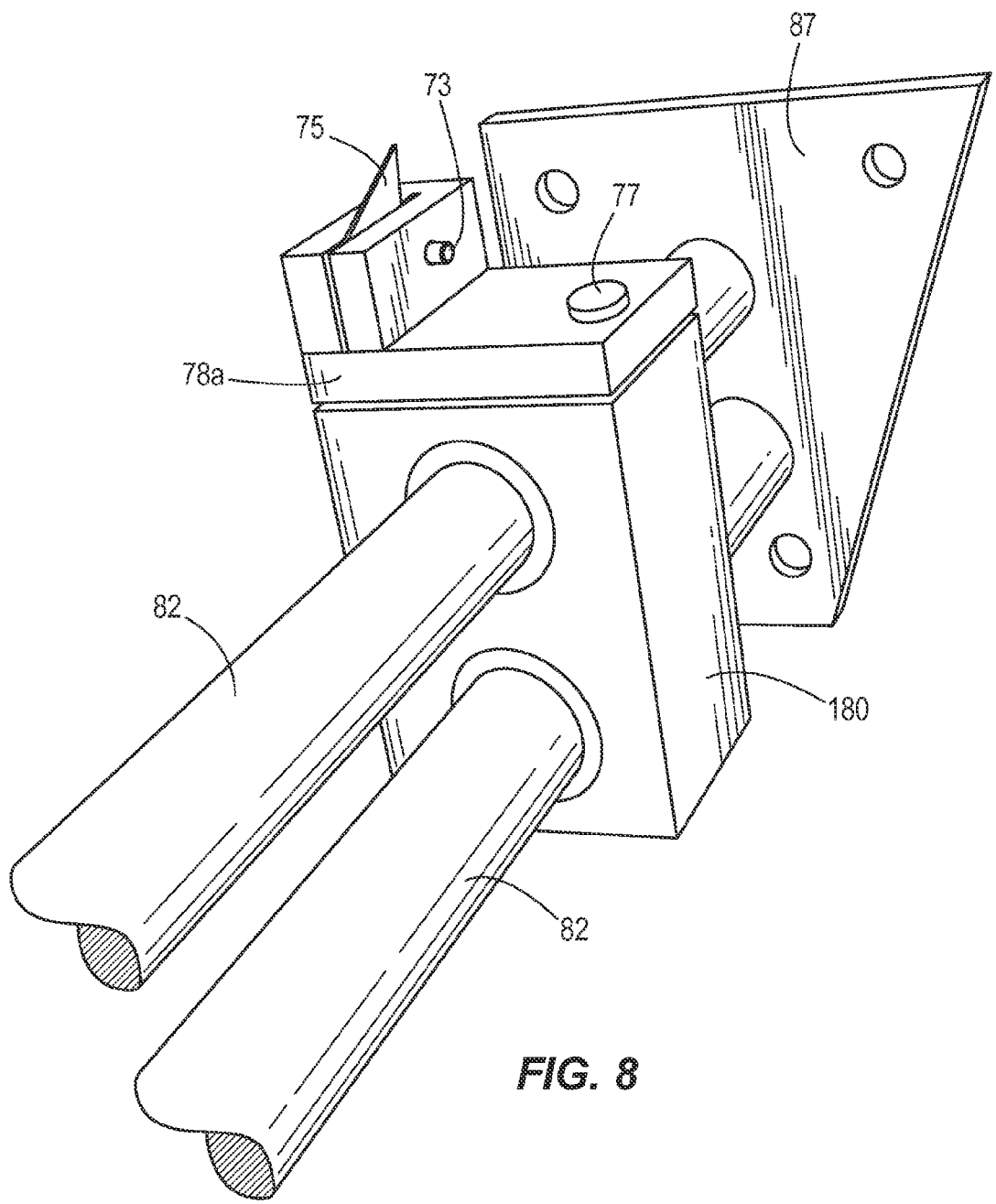
FIG. 8 is a top perspective view of another exemplary knife blade assembly of the casing removal system.

With respect to FIG. 8, the guide rods 82 are connected to end plates 87 on both ends of the guide rods 82. The end plates 87 are connected to vertical support bar members 24*b* on the support frame 20.

FIG. 8 also illustrates another example of a holder block 78*a*, which may hold the knife blade 75 near or on one side of the holder block 78*a* rather than near or at a center of the holder block as illustrated in the example shown in FIG. 7. A screw 77 is used to connect the holder block 78*a* to the carriage block 180. A transverse screw 73 is used to connect the knife blade 75 to the holder block 78*a*.

Referring again to FIGS. 1, 3, 4, 11 and 13, the position of the knife slot 70 may be located at any position upstream of the vacuum region 80. A length of the knife blade 75 and the position of the knife slot 70 may be optimized such that the knife blade 75 makes an incision along at least a portion of the length of the food product at a desired position. In one example, the knife slot 70 may be positioned such that the knife slot 70 is tangent to a surface of the food product. In other examples, the knife slot 70 may be positioned further away from a surface of the food product. If the knife slot 70 is positioned further away, the length of the knife blade 75 is increased to ensure that the knife blade 75 makes contact with the surface of the food product. In further examples, the length of the knife blade 75 is adjustable to suit products of various sizes to adjust the depth of penetration below the surface of the casing. In still other examples, the amount of the knife blade 75 that projects above and out of the slot 70 is adjustable.

In one example, the knife blade 75 may extend toward the encased food product from the staging plate 40. In another example, the knife blade 75 may extend downwards toward the food product from above to make contact with the encased food product. In a further example, the knife blade 75 may be located at any position relative to the food product and be adjacent to the vacuum region 80.

As illustrated in FIG. 4, the vacuum region 80 is disposed between the stop mechanism 90 and the knife slot 70. Additionally, the vacuum region 80 is positioned upstream of the stop mechanism 90 and downstream of the knife slot 70. The vacuum region 80 provides a negative pressure region on the inclined surface 30. In the illustrated example of FIG. 4, the vacuum region 80 includes a plurality of suction cups 61 which protrude upwards from the inclined surface 30. The plurality of suction cups 61 exert a negative pressure or suction force.

Figure 9:
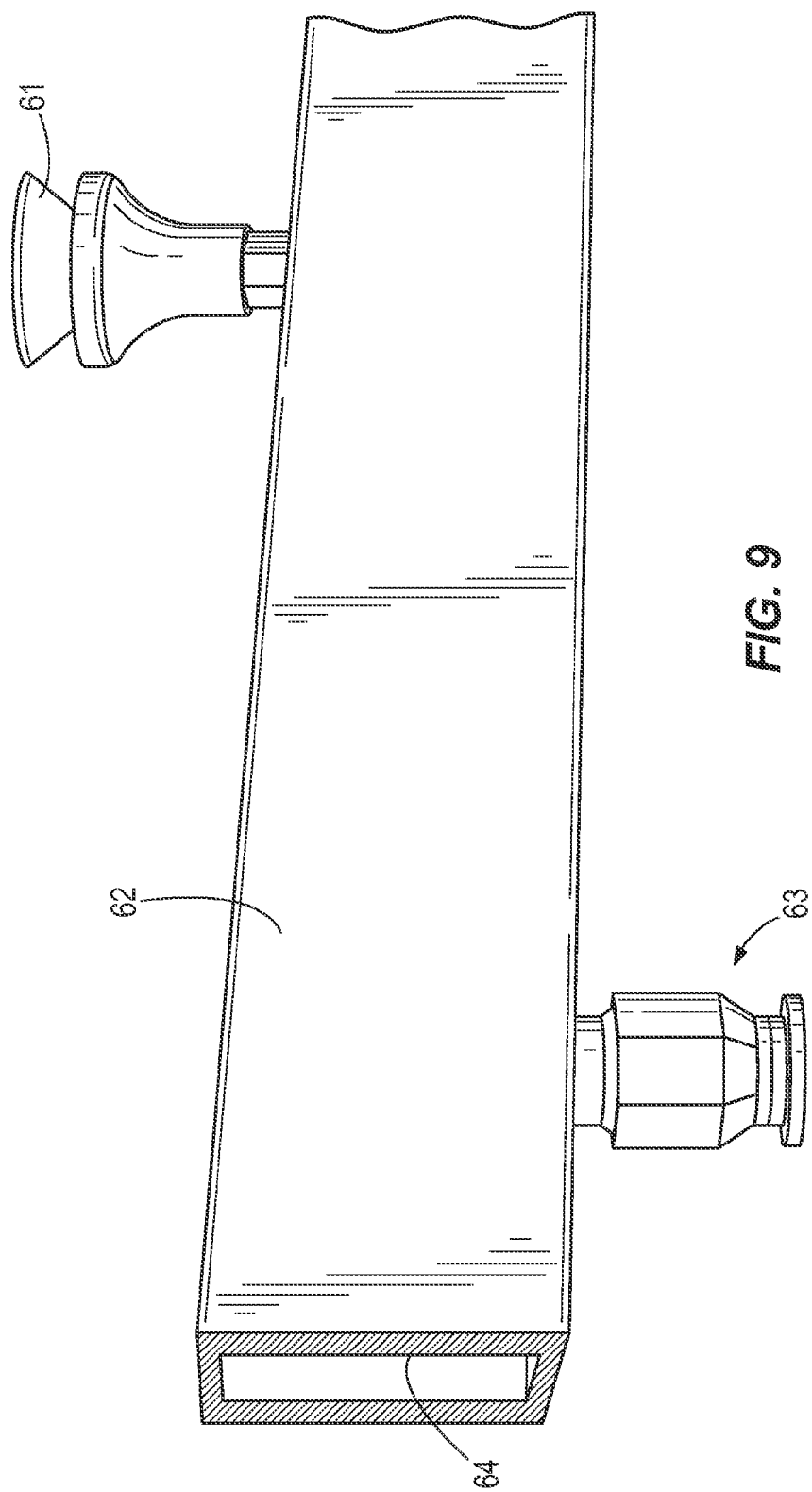
FIG. 9 is a perspective view of an exemplary support bar with an exemplary inlet valve.
Figure 10:
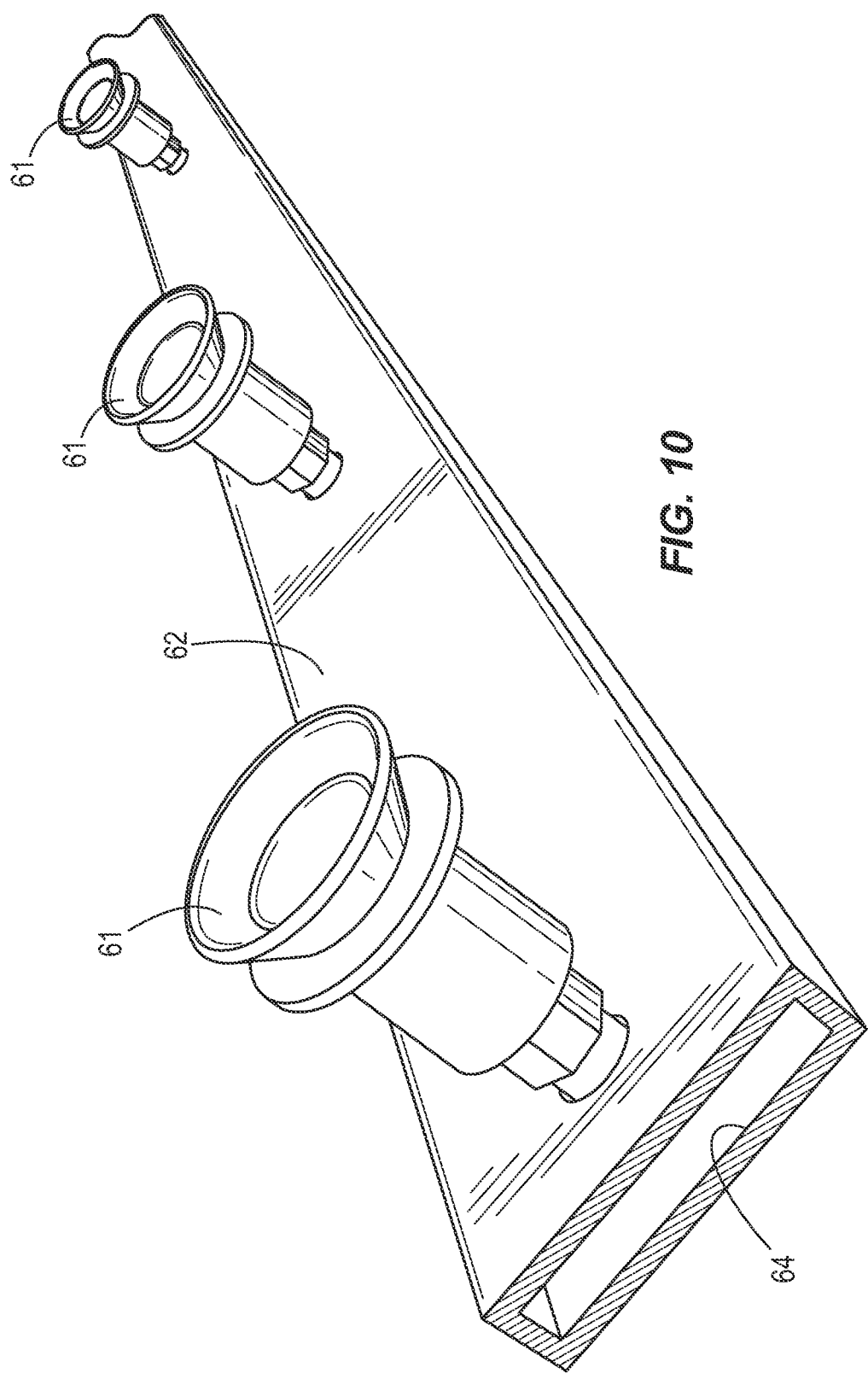
FIG. 10 is a perspective view of a plurality of exemplary suction cups on a support bar.

FIGS. 9 and 10 illustrate an exemplary arrangement of the suction cups 61 in more detail. Suction cups 61 are connected to a support bar 62 comprising a common chamber 64 (see FIGS. 9 and 10) in communication with a channel or a valve 63 (see FIG. 9). The channel or valve 63 is connected to a vacuum source. Alternatively, each suction cup 61 may be connected to individual outlets 66 on a hose connector bar 99 (see FIG. 6) which is connected to a vacuum source.

In yet another example, the vacuum region 80 may include a vacuum surface defining a plurality of apertures therein to provide a porous surface in communication with a vacuum such that a negative pressure or suction force is provided by the vacuum surface via the apertures. The vacuum surface may be flush with the inclined surface 30, or may be recessed below the inclined surface 30, either continuously along a desired length of the vacuum region 80 or discontinuous. Various other methods of providing a vacuum source in contact with the casing of the food product may also be used.

In yet a further example, an adhesive force may be used in lieu of, or in conjunction with the vacuum force to exert a force on the casing. Moreover, a wide variety of types of force may be used to maintain the casing in a stationary position relative to the food product enclosed within the casing. For example, a mechanical retaining or retainer member may engage and retain the casing in place by applying a mechanical retaining force to the casing. Some examples of mechanical members include, but are not limited to, a mechanical gripper, pincher, grasper, etc., may mechanical grip, pinch, or grasp the casing to retain the casing in place.

The distance D between the vacuum region 80 and the knife slot 70 is selected such that the vacuum region 80 is able to grasp the casing of the food product at a position proximate to the cut edge of the casing to allow for ease of removing the casing. The distance D may be adjusted to accommodate food products of various sizes.

In other examples, the vacuum source may be disposed on the staging plate 40, or be located above the food product. In further examples, the position of the vacuum region 80 and/or the suction cups 61 may be adjustable to accommodate products of various sizes.

Figure 5:
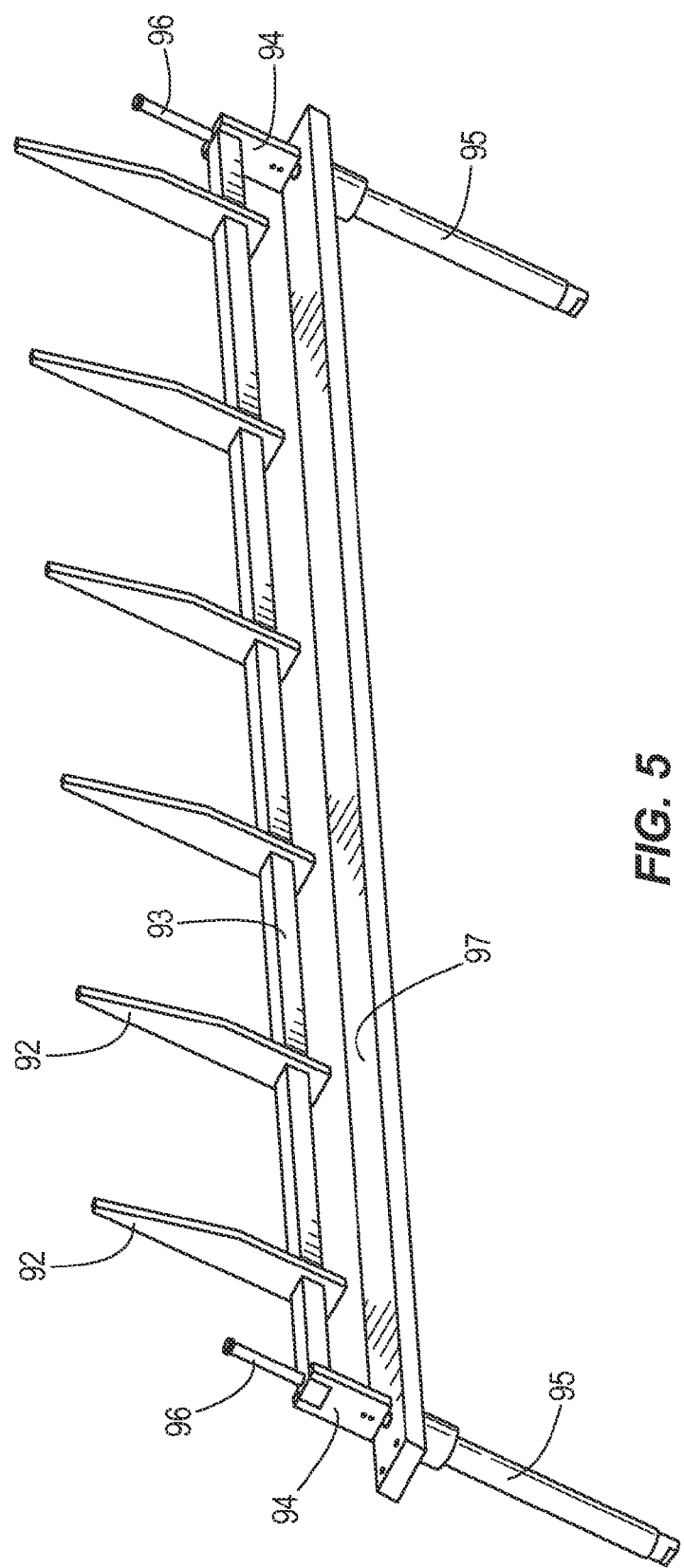
FIG. 5 is a front perspective view of exemplary finger members of the stop mechanism.

With reference to FIG. 1, the stop mechanism 90 is illustrated in its inactivated position, and, with respect to FIG. 3, the stop mechanism 90 is illustrated in its activated position. FIGS. 4 and 5 illustrate exemplary components of the stop mechanism 90. In one example, the stop mechanism 90 includes a plurality of slots 91 (see FIG. 4) defined in the inclined surface 30, through which finger members 92 (see FIG. 5) protrude to stop food products from moving down the inclined surface 30. The finger members 92 are connected to a bar 93. The bar 93 is connected at its ends to end members 94, which are connected to the actuators 96 of the pneumatic air cylinders 95 (see FIGS. 3 and 5). The air cylinders 95 are connected to a support bar 97 (see FIGS. 3 and 5) which is connected on either end to support frame cross members 26 (see FIG. 1). In one example, the support frame cross members 26 may be mounted at the same angle as the inclined surface 30 such that the actuators 96 are oriented generally perpendicular to both the members 26 and the inclined surface 30 to extend the finger members 92 in a direction generally perpendicular to the inclined surface 30. In other examples, the finger members 92 may extend through and relative to inclined surface 30 at an angle other than perpendicular to the inclined surface 30. In the inactivated or depressed position of the finger members 92, the finger members 92 are of a length that allows the finger members 92 to register within the slots 91 and to maintain alignment of the finger members 92 within their respective slots 91. The finger members 92 are of a length, and positioned at a distance below the surface of the inclined surface 30, such that when the finger members 92 are activated, the finger members 92 protrude through the inclined surface 30 a sufficient distance to stop the food product from rolling down the inclined surface 30. The degree of extension, and/or the mounting of the finger members 92, may be adjusted as needed to accommodate various sizes of food products.

In some examples, the stop mechanism 90 may be a gate which extends upward from the inclined surface 30. In other examples, the stop mechanism 90 may be a gate that is lowered and lifted from above the inclined surface 30, or the stop mechanism 90 may be a gate that is moved into position horizontally (see FIG. 12) across the inclined surface 30. Any other mechanism known to one skilled in the art may be used to prevent the food product from rolling down the inclined surface 30.

In some examples, the pneumatic air cylinders 95 connect to the vertical support bar 24b at an angle θ (see FIG. 12) and the angle θ may be adjusted to accommodate food products of various sizes. An adjustment to angle θ that increases the value of θ will allow the finger members 92 to move to a position further down the inclined surface 30 in a direction B. Moving the finger members 92 by adjusting the angle θ will cause the relative lengths X1 and X2 to vary. X1 is the protrusion or the length of the finger members 92 extending beyond the inclined surface 30.

Alternatively, the finger members 92 may be translationally moved such that the finger members 92 extend into the plane of the inclined surface 30 at a position further downstream on the inclined surface 30. The slots 91 through which the finger members 92 extend may be elongated to accommodate various positions of the finger members 92.

Figure 11:
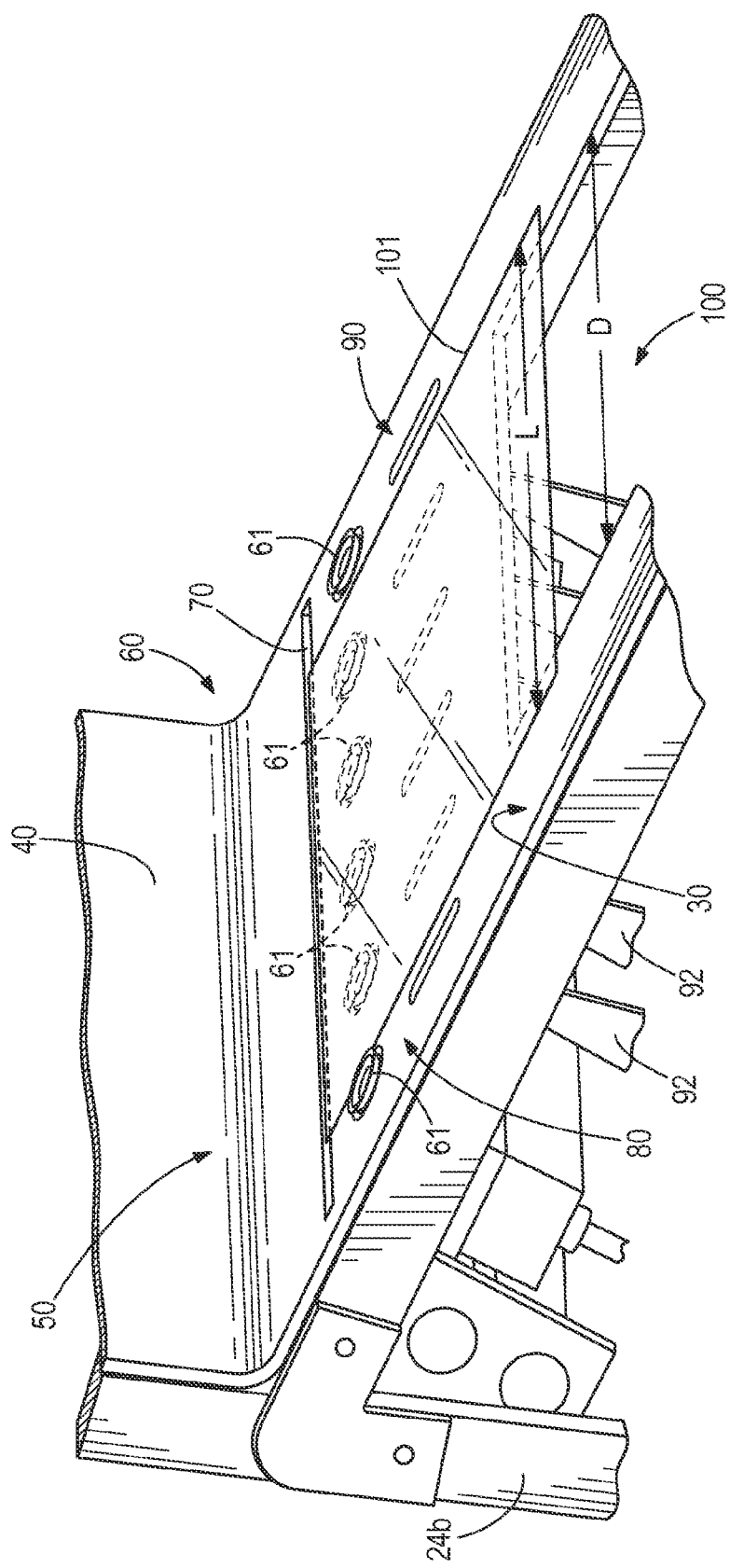
FIG. 11 is a top perspective view of a removed casing on an exemplary inclined surface of the casing removal system, the removed casing is disposed over a portion of an exemplary discard mechanism.

FIGS. 1, 3 and 11 illustrate one example of the discard mechanism 100 for removing the casing 101 (see FIG. 11) once the casing 101 has been removed from the encased food product. In one example, the discard mechanism 100 is an opening in the inclined surface 30 that spans a width D (see FIG. 3). Width D is smaller than a length L (see FIG. 11) of an encased food product. To discard the casing 101, the vacuum force applied by the suction cups 61 that grips the casing 101 is released to allow the casing 101 to slide down the inclined surface 30 and fall into the opening 100 under the force of gravity. In an alternate example, a source of vacuum may be disposed beneath the opening to provide a downward vacuum force to pull the casing 101 through the opening where it is discarded. The source of vacuum may be the same vacuum source providing a vacuum force in the vacuum region 80 or may be a separate vacuum source. In other examples, the width D of the opening 100 in the inclined surface 30 may be larger than the length L of the casing 101 of an encased food product.

In one example, an encased food product is loaded axially into the staging region 50. The stop mechanism 90 in the staging region 50 during loading is activated to prevent the food product from rolling down the inclined surface 30. The knife blade 75 travels along the knife slot 70 to cut along the length L of the encased food product. Once an incision along the casing 101 has been made, the stop mechanism 90 is lowered to allow the encased food product to roll down the inclined surface 30. The vacuum region 80 is activated prior to, or simultaneously with, the start of the food product's downward roll. The force exerted by the vacuum region 80 grasps the casing 101 of the food product and peels off the casing 101 as the food product rolls down the inclined surface 30. The vacuum source is discontinued to allow the removed casing 101 to slide down the inclined surface 30 and fall into the discard mechanism 100 under the force of gravity. Alternatively, the vacuum source may be discontinued to release the vacuum's grip on the casing 101 near the cut edge, and a vacuum source may be applied to the casing 101 disposed over the opening in the discard mechanism 100 to assist the casing 101 in being disposed through the opening.

In one example, the knife blade 75 moves from a start position and travels the length of the knife slot 70, and then returns to the start position to wait for the next food product to be loaded. In other examples, the knife blade 75 moves from the start position to the other end of the knife slot 70 to make a cut along the length L of a food product. The next food product is loaded from the other side of the inclined surface 30 such that the return movement of the knife blade 75 to its start position allows the knife blade 75 to cut along the length L of the next food product, thus utilizing the time the knife blade 75 moves to its return position to cut into the next food product. In another example, the knife blade 75 is stationary and positioned such that when a food product is axially loaded, the knife blade 75 at the loading end of the inclined surface 30 cuts into the casing 101 as the food product moves past the knife blade 75.

In an alternate example, the food product may be loaded transversely into a staging position in the staging region 50, or may be deposited onto the inclined surface 30 from an elevated position. In one example, the staging plate 40 may assist in loading the food product into its staging position. The staging plate 40 may pivot about a hinge 58 (see FIG. 13) to accommodate food products of various sizes.

From the foregoing, it will be observed that numerous variations and modifications may be effected without departing from the spirit and scope of the present disclosure. It is to be understood that no limitation with respect to the specific apparatus illustrated and described herein is intended or should be inferred.

It should be understood that the use of any orientation or directional terms herein such as, for example, "top", "bottom", "front", "rear", "back", "left", "right", "side", "above", "below", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the casing removal systems may be utilized in any orientation and use of such terms is intended to correspond to the exemplary orientation of the casing removal systems illustrated in the drawings. The use of these terms in association with the casing removal systems is not intended to limit the casing removal systems to a single orientation or to limit the casing removal systems in any manner.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted in any manner.

What is claimed is:

1. A system for removing a casing from an encased food product, the system comprising:
   an inclined surface including a top end and a bottom end, wherein the top end is higher in elevation than the bottom end;
   a cutting member configured to move relative to the inclined surface and the encased food product to slit the casing of the encased food product;
   a retaining member configured to retain the casing of the encased food product subsequent to slitting the casing;
   a staging area at least partially defined by and positioned at the top end of the inclined surface, and wherein the staging area is configured to receive the encased food product prior to being slit by the cutting member; and
   a slot defined in the inclined surface, wherein at least a portion of the cutting member is positioned in the slot and is configured to move within and along the slot, through the inclined surface.

2. The system of claim 1, wherein the retaining member is adjacent to and downstream from the cutting member.

3. The system of claim 1, wherein the cutting member is a knife blade.

4. The system of claim 1, wherein the retaining member is a vacuum member configured to apply a vacuum force to the casing.

5. The system of claim 4, wherein the vacuum member is at least one suction cup.

6. The system of claim 1, further comprising a carriage moveable along at least one guide rod, wherein the cutting member is coupled to and moveable with the carriage.

7. The system of claim 1, further comprising a plate extending from the inclined surface.

8. The system of claim 7, wherein the plate is pivotable relative to the inclined surface.

9. A system for removing a casing from an encased food product, the system comprising:
   an inclined surface;
   a cutting member configured to move relative to the inclined surface and the encased food product to slit the casing of the encased food product;
   a retaining member configured to retain the casing of the encased food product subsequent to slitting the casing; and
   a stop mechanism downstream of the retaining member along the inclined surface;
   wherein the inclined surface defines an opening therein, wherein the stop mechanism is moveable relative to the inclined surface between a first position, in which at least a portion of the stop mechanism protrudes through the opening above the inclined surface, and a second position, in which the stop mechanism is positioned below the inclined surface, and wherein, when the stop mechanism is in the first position, the stop mechanism is configured to inhibit food product from moving down the inclined surface.

10. The system of claim 9, wherein the stop mechanism is a gate configured to move along a plane that intersects a plane of the inclined surface.

11. The system of claim 9, wherein the inclined surface defines a plurality of openings therein and the stop mechanism includes a plurality of stop members, wherein each of the plurality of stop members is configured to move relative to the inclined surface within a respective one of the plurality of openings to inhibit food product from moving down the inclined surface.

12. A system for removing a casing from an encased food product, the system comprising:
   an inclined surface;
   a cutting member configured to move relative to the inclined surface and the encased food product to slit the casing of the encased food product;
   a retaining member configured to retain the casing of the encased food product subsequent to slitting the casing; and
   a discard mechanism configured to discard the casing after removal from the encased food product;
   wherein the discard mechanism is an opening defined in the inclined surface.

13. The system of claim 12, wherein the opening is downstream of the cutting member and the retaining member along the inclined surface.

* * * * *